(12) United States Patent
Cassaday

(10) Patent No.: US 7,832,803 B2
(45) Date of Patent: Nov. 16, 2010

(54) HEADREST LINKAGE

(76) Inventor: Terry Cassaday, 61 Hill Lolm Road, Toronto, Ontario (CA) M5P 1M4

(*) Notice: Subject to any disclaimer, the term of this patent is extended or adjusted under 35 U.S.C. 154(b) by 0 days.

(21) Appl. No.: 11/736,164

(22) Filed: Apr. 17, 2007

(65) Prior Publication Data

US 2008/0258532 A1 Oct. 23, 2008

(51) Int. Cl.
A47C 7/38 (2006.01)
A61G 15/12 (2006.01)
(52) U.S. Cl. .................. 297/408; 297/391; 297/403; 297/404
(58) Field of Classification Search ............. 297/403, 297/408, 404, 391
See application file for complete search history.

(56) References Cited

U.S. PATENT DOCUMENTS

| | | | | | |
|---|---|---|---|---|---|
| 1,137,903 | A | * | 5/1915 | Ritter | 297/368 |
| 1,572,215 | A | * | 2/1926 | May | 297/409 |
| 1,686,631 | A | * | 10/1928 | May | 297/406 |
| 1,728,025 | A | * | 9/1929 | Weber | 297/391 |
| 1,814,876 | A | * | 7/1931 | Weber | 297/409 |
| 1,817,755 | A | * | 8/1931 | May | 297/409 |
| 2,348,961 | A | * | 5/1944 | Cowper | 297/409 |
| 2,740,467 | A | * | 4/1956 | Page | 297/409 |
| 3,572,835 | A | * | 3/1971 | Kees et al. | 297/410 |
| 3,761,128 | A | * | 9/1973 | Schenk et al. | 297/408 |
| 3,885,831 | A | * | 5/1975 | Rasmussen | 297/410 |
| 4,366,985 | A | * | 1/1983 | Leffler | 297/409 |
| 4,592,526 | A | | 6/1986 | Kobelt | |
| 5,177,823 | A | | 1/1993 | Riach | |
| 5,921,630 | A | | 7/1999 | Cassaday | |
| 5,992,937 | A | | 11/1999 | Pilhall | |
| 6,085,384 | A | | 7/2000 | Bivens | |
| 6,368,261 | B1 | * | 4/2002 | Doehler | 482/142 |
| RE37,712 | E | | 5/2002 | Gannon | |
| 6,397,414 | B1 | | 6/2002 | Lloyd | |
| D496,462 | S | * | 9/2004 | Walters et al. | D24/183 |
| 6,893,096 | B2 | | 5/2005 | Bonn et al. | |
| 6,922,869 | B2 | | 8/2005 | Bivens | |
| 7,008,019 | B2 | | 3/2006 | Lampke et al. | |
| 7,093,313 | B2 | | 8/2006 | DeBraal et al. | |
| 7,350,249 | B2 | * | 4/2008 | Jacobs et al. | 5/624 |
| 7,350,250 | B2 | * | 4/2008 | Froelich | 5/637 |
| 2002/0046441 | A1 | * | 4/2002 | Brustle | 16/254 |
| 2004/0130196 | A1 | | 7/2004 | Costaglia | |
| 2005/0067875 | A1 | * | 3/2005 | DeBraal et al. | 297/409 |
| 2007/0157429 | A1 | * | 7/2007 | Gallasch et al. | 16/238 |
| 2007/0192994 | A1 | * | 8/2007 | Chuang | 16/342 |
| 2007/0251058 | A1 | * | 11/2007 | Fitz et al. | 16/287 |

OTHER PUBLICATIONS

Reel Product Datasheet TI100 1018 Torque Insert www.reell.com.

* cited by examiner

*Primary Examiner*—Rodney B White
*Assistant Examiner*—James Alex

(57) ABSTRACT

An adjustable linkage to support an object comprising a pair of arms rotatable about a first axis, one of said arms supporting said object and damper means disposed about said first axis between said arms for selective rotational movement and placement of said object relative said other arm.

21 Claims, 5 Drawing Sheets

HEADREST LINKAGE

FIELD OF THE INVENTION

This invention relates to a headrest linkage and in particular to an adjustable headrest for a chair that includes a hinge damper for selective rotatable movement and placement of the headrest to a desired position. The invention also relates to a method of selectively adjusting the position of a headrest relative to a chair.

BACKGROUND OF THE INVENTION

Various devices have heretofore been proposed concerning linkage mechanisms for pivotally supporting an object such as a headrest for a chair.

For example U.S. Pat. No. 7,093,313 relates to a linkage mechanism for an adjustable arm assembly where the linkage assembly is used to support an object such as a headrest for use in connection with an examination table. The linkage mechanism provides a structure to interlock or disengage two adjoining arm sections.

Furthermore U.S. Pat. No. 7,800,019 relates to a headrest for use with a seat back having a mount operatively attached to the seat back and a headrest pivotally mounted so that it may pivot or swivel forward about a swivel axis. In use, a spring places pressure or a load on the headrest and may be engaged or locked against folding forward because of the spring.

Moreover U.S. Pat. No. 6,893,096 teaches a mechanism for supporting and permitting selective adjustment of the position of a headrest relative to the back of a chair which includes an elongated housing, support brackets pivotally connected adjacent opposite ends of the body, and a plurality of interleaved elongate plate members extending longitudinally of the body and moveable relative thereto.

Other arrangements are shown in U.S. Pat. No. 5,992,937 which relates to an adjustable headrest for vehicle seats which include a first support mounted on a vehicle seat, a second support pivotally mounted with respect to the first support, the second support mounting a headrest and an adjustable control for adjusting the position of the second support into a plurality of locking angular positions with respect to the first support.

Also, U.S. Publication No. US 2004/0130196 teaches a device for the adjustment of the compression force of the spring in an articulation for a chair.

Other adjustable mechanisms are disclosed in U.S. Pat. Nos. 6,397,414, 5,177,823, and 4,592,526.

Moreover various devices have heretofore been used to provide adjustment mechanisms for hinge joints. For example, U.S. Pat. No. 6,922,869 relates to damper apparatus for dampening movement between a first and second element while U.S. Pat. No. 5,697,125 relates to a frictional torque hinge.

It is an object of this invention to provide an improved adjustable headrest that is easy to construct and use.

It is an aspect of this invention to provide an adjustable linkage to support an object comprising a pair of arms rotatable about a first axis, one of said arms supporting said object and damper means disposed about said first axis between said arms for selective rotational movement and placement of said object relative said other arm.

It is a further aspect of this invention to provide an adjustable headrest for a chair comprising a first arm member having one end rotatably connected to said chair; a second arm member having one end rotatably connected to said headrest; said first arm member having another end rotatably connected to another end of said second arm member about an axis of rotation; a hinge damper co-axially disposed about said axis of rotation between said first and second arms for selective rotational movement and placement of said headrest to a desired position.

Yet another aspect of the invention relates to a method of selectively adjusting the position of a headrest relative to a chair comprising: placement of at least one hinge damper between said headrest and said chair for selective rotational movement of said headrest about said hinge damper for placement of said headrest to a desired position.

BRIEF DESCRIPTION OF THE DRAWINGS

These and other objects and features of the invention shall now be described in relation to the following drawings.

DISCLOSURE OF THE INVENTION

Figure 1:
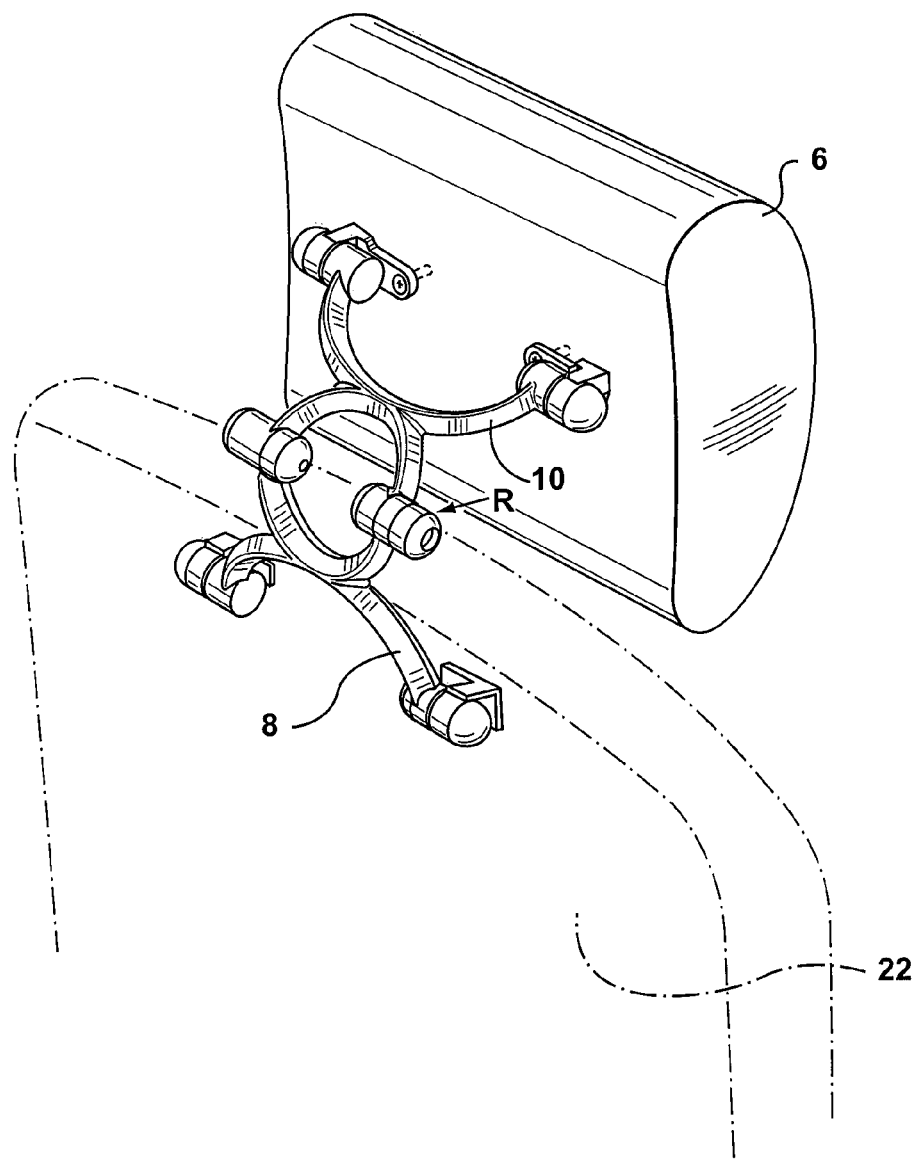
FIG. 1 is a perspective view of the adjustable linkage.
Figure 4A:
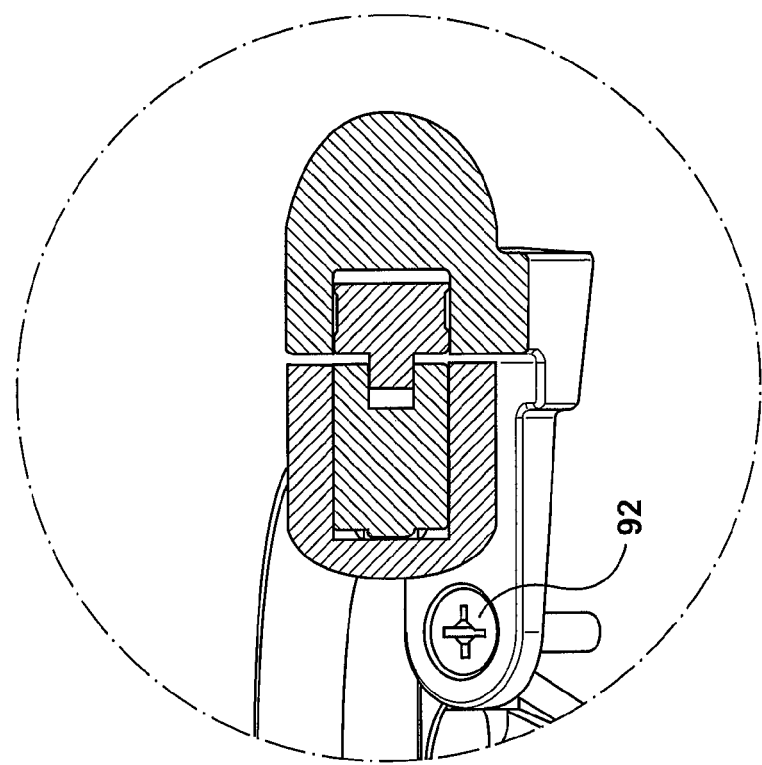
FIG. 4a is a partial exploded view of FIG. 4.

In the description which follows, like parts are marked throughout the specification and the drawings with the same respective reference numerals. The drawings are not necessarily to scale and in some instances proportions may have been exaggerated in order to more clearly depict certain features of the invention.

Figure 2:
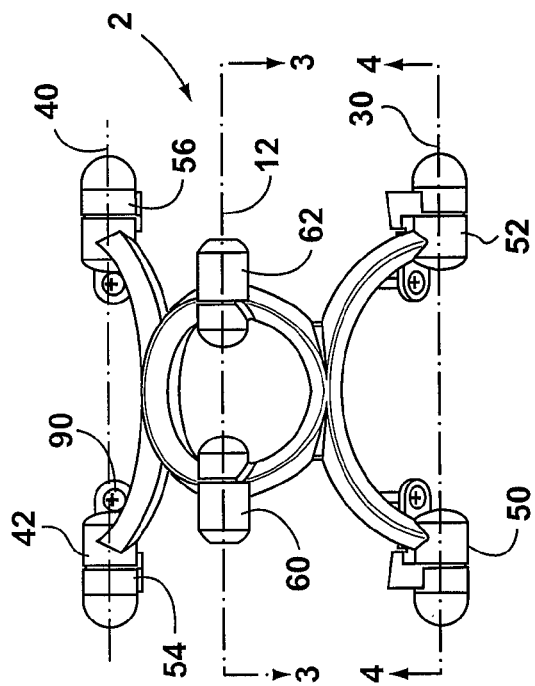
FIG. 2 is a top plan view of the adjustable headrest.
Figure 4:
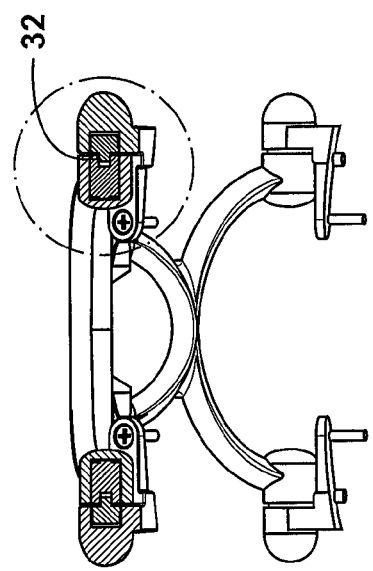
FIG. 4 is a sectional view taken along the line 4-4 of FIG. 2.
Figure 3:
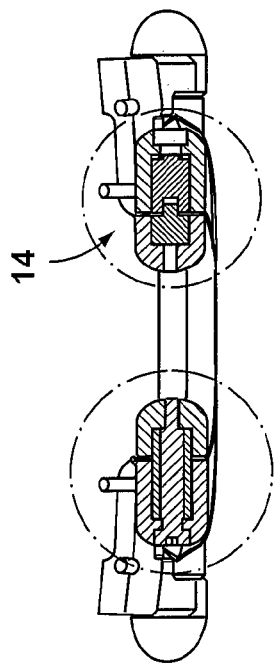
FIG. 3 is a sectional view taken along the line 3-3 of FIG. 2.
Figure 3B:
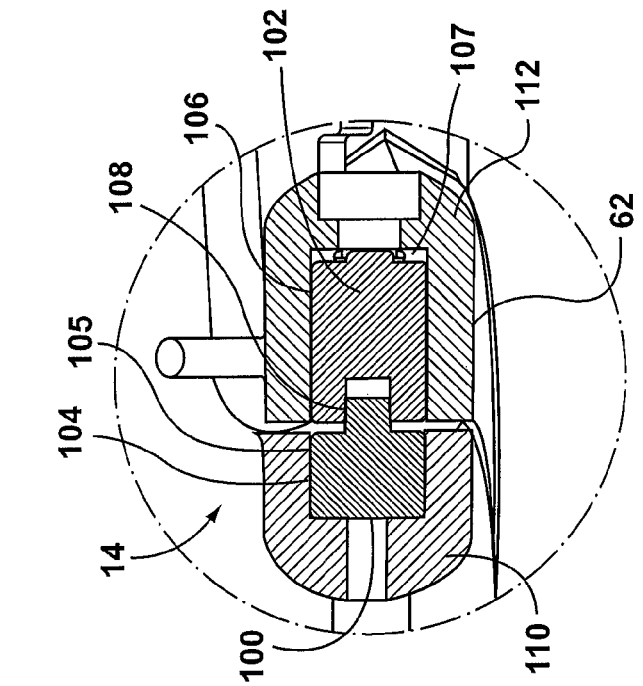
FIG. 3b is a partial exploded view of FIG. 3
Figure 3A:
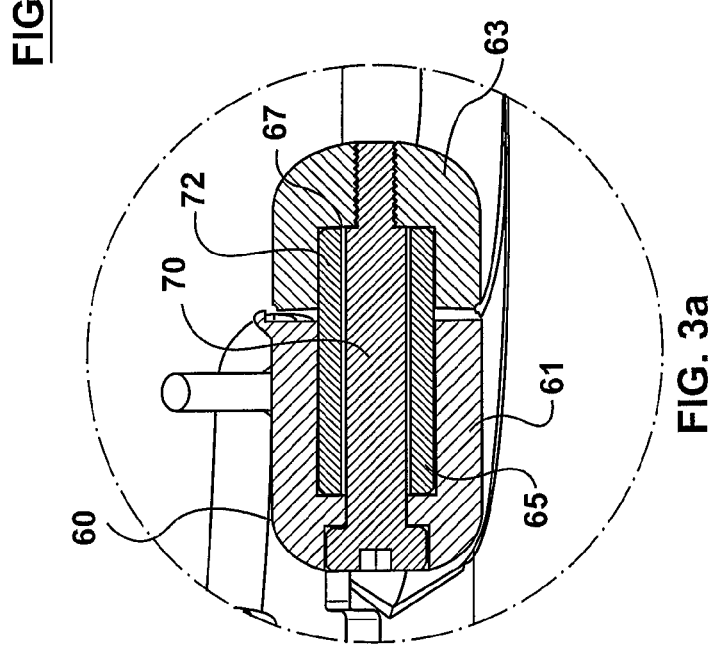
FIG. 3a is a partial exploded view of FIG. 3.
Figure 5:
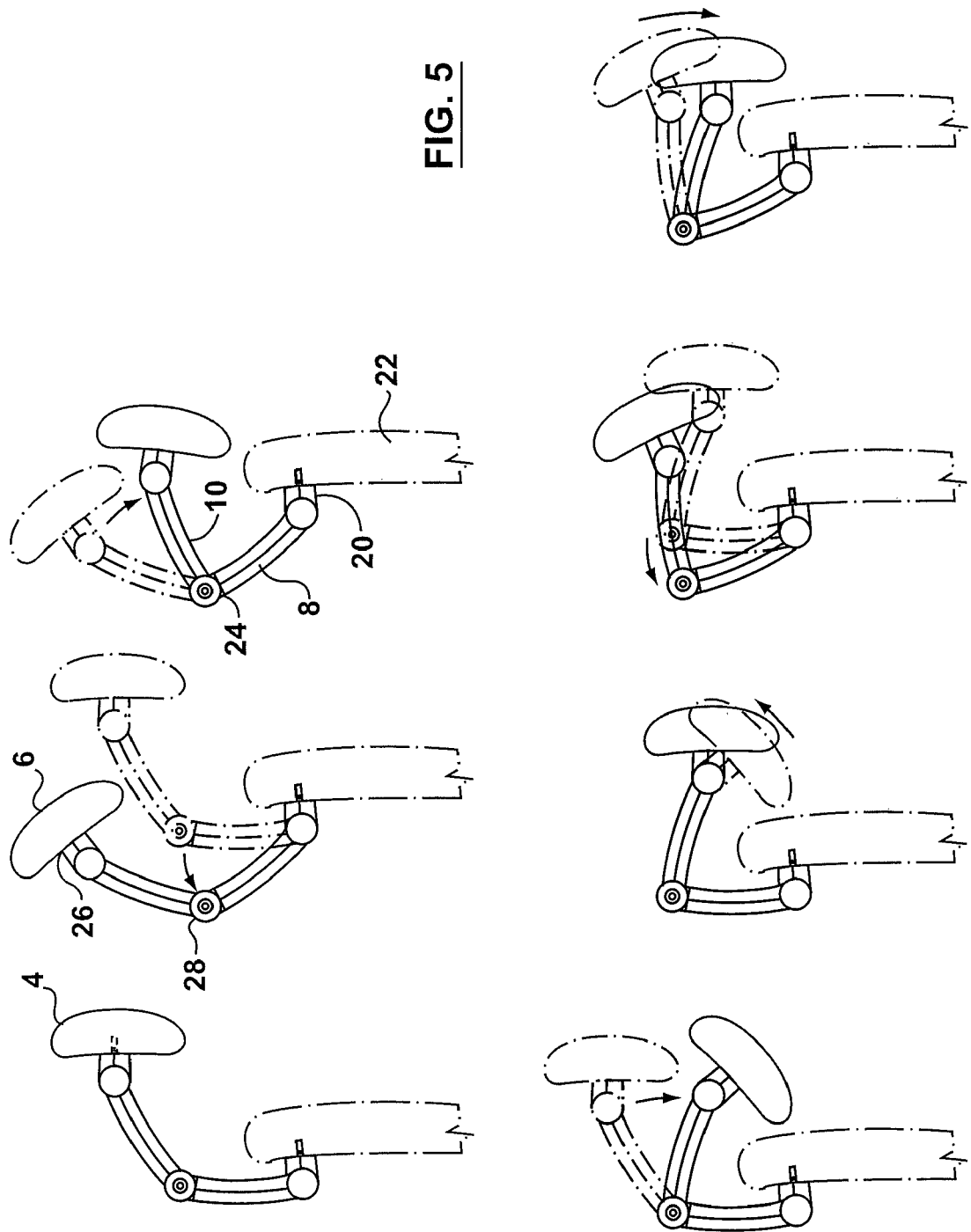
FIG. 5 is a series of side views showing a range of articulation of the headrest linkage to a plurality of positions.

FIGS. 1 and 2 illustrate an adjustable linkage 2 for supporting an object 4 such as a headrest 6 or the like.

The adjustable linkage 2 comprises a pair of arms 8 and 10 rotatable about a first axis 12 where one of said arms 10 supports the object 4 or headrest 6.

The adjustable linkage 2 also includes a damper means 14 disposed about the first axis 12 between the arms 8 and 10 for selective rotational movement and placement of the headrest 6 relative to the arm 8.

The damper means 14 as shown in the drawings comprise a hinge damper or frictional torque hinge 14 which are generally available in the marketplace. For example a hinge damper is available from Illinois Toolworks Inc. as Delpro part number 43-005033. Furthermore Reell Precision Manufacturing Corporation of Saint Paul, Minn. sells frictional torque hinges with the designation T1200 frictional torque hinge. Other hinge dampers or frictional torque hinges are available.

As shown in the drawings the frictional torque hinge 14 is co-axially disposed about the first axis 12.

In particular a pair of arms 8 and 10 comprise a first arm section 8 having one end 20 attachable to a chair back 22. The first arm section 8 also includes another end 24. The second arm section 10 has one end 26 attachable to a headrest 6 as well as another end 28 rotatably attached to the other end 24 of first arm section 8. The other end 24 of the first arm section 8 is rotatably connected to the hinge damper 14 or frictional torque hinge about said first axis of rotation 12 as shown.

Moreover the one end 20 of the first arm section 8 is rotatably attached to the chair back 22 about a second axis of rotation 30 and further includes a second damper means 32 co-axially disposed between the chair back 22 and the one end 20 of the first arm section 8.

Also, one end 26 of the second arm section 10 is rotatably attached to the headrest 6 about a third axis of rotation 40, and further includes a third damper means 42 co-axially disposed between the headrest 6 and the one end 26 of the second arm section 10.

In one embodiment one of the first, second, and third damper means has a different strength or co-efficient of resistance to rotation than the other damper means.

Furthermore as shown, the first and second arms 8 and 10 are curved so as to assist in the placement of the headrest 6 beyond the chair back 22.

Each of the first and second arm sections 8 and 10 have one end 20 and 26 respectively which have a pair of spaced legs 50, 52 and 54, 56 respectively.

The legs 50 and 52 define anchors, housing or trunions for carrying at least one of the second and third damper means 32 and 42 respectively. The legs 50 and 52 are rotatably connected to the chair back 22 for rotation about the second axis 30, while the spaced legs 54 and 56 of the second arm 10 is rotatably connected to the headrest 6 about the third axis of rotation 40.

Each of the curved arm sections 8 and 10 have another end 24 and 28 respectively which define a pair of spaced trunions, anchors or housing 60 and 62 which carry at least one of the first damper means 14 for selective rotational movement about the first axis 12. As shown in the figures one of the housing or trunions 62 carries the first hinge damper 14 while the other housing or trunions 60 includes a shoulder screw 70 which is disposed in a bushing 72 as shown. Also each of the curved arm sections 8 and 10 comprise opposed "C" shaped sections to provide a light weight stable structure.

The housing 60 comprises a first housing section 61 co-axially aligned with a second housing section 63. Each of the first and second housing sections 61 and 63 define a first cavity 65 with a second cavity 67 respectively which is adapted to receive the bushing 72. The screw 70 can be selectively screwed into the second housing section 63 to variably adjust the tension of rotation therein. An adhesive such as Locktite™ on the threads 80 may be applied to keep the screw 70 from loosening. Alternatively, both housing and anchors 54 and 56 can each include the screw arrangement as described above or the hinge damper as previously described.

The housing 54 and 56 include appropriate holes 90 to receive fastening means such as screws 92 or the like which are adapted to be inserted into the headrest 6.

Furthermore the housing or anchors 50 and 52 also include appropriate holes 90 to receive fastening means 92 adapted to be connected to the back 22 of the chair.

In one embodiment two hinge dampers 14 can be utilized at the headrest end 26 having a 1.4 Nm strength damper at both locations. However, the strength of the damper described is illustrative only and any other damper strength having a different co-efficient of resistance to torsional movement can be utilized within the scope of the invention described herein.

Furthermore in another embodiment at the back end 20 two hinge dampers having a damper strength of 2.2 Nm can be utilized. Alternatively, one hinge damper may be used, or the screw and bushing assembly as shown can be used.

The housing 60 and 62 can include at least one hinge damper 14 as shown.

The invention described herein permits a user to selectively move the headrest relative to the arm linkage as shown so as to position the headrest to a comfortable position away from the back 22 by moving the linkage 2 as described above. Once placed in the selected position the user "lets go" of the headrest which will rest in the selected position without moving.

Different strengths of hinge dampers may be utilized so that a stronger resistance to movement would be exhibited at the first axis of rotation which would exhibit the strongest force resistant to movement thereabout. Weaker strength hinge dampers can be utilized at the other locations.

As shown in the figures the use of the hinge dampers permits the articulation of the headrest 6 relative to the chair 21 in a number of desired positions as shown by easily pushing against the hinge dampers and letting go at the desired location. If the user decides to move the headrest to another position this can easily be done by pushing against the headrest to the desired position.

Moreover if another person decides to use the adjustable headrest, they could easily sit in the chair and move the headrest to their desired position.

The invention described herein also relates to a method of selectively adjusting the position of the headrest 6 relative to a chair 21 comprising placement of at least one hinge damper 14 between the headrest 6 and the chair 21 for selective rotational movement of the headrest 6 about the hinge damper 14 for placement of the headrest 6 to a desired position.

The linkage 2 can have at least a second axis of rotation between the headrest 6 and the chair 22 and at least two hinge dampers co-axially disposed about the two axis of rotation respectively when the hinge dampers have different coefficients of resistance to rotational movement.

Figure 6:
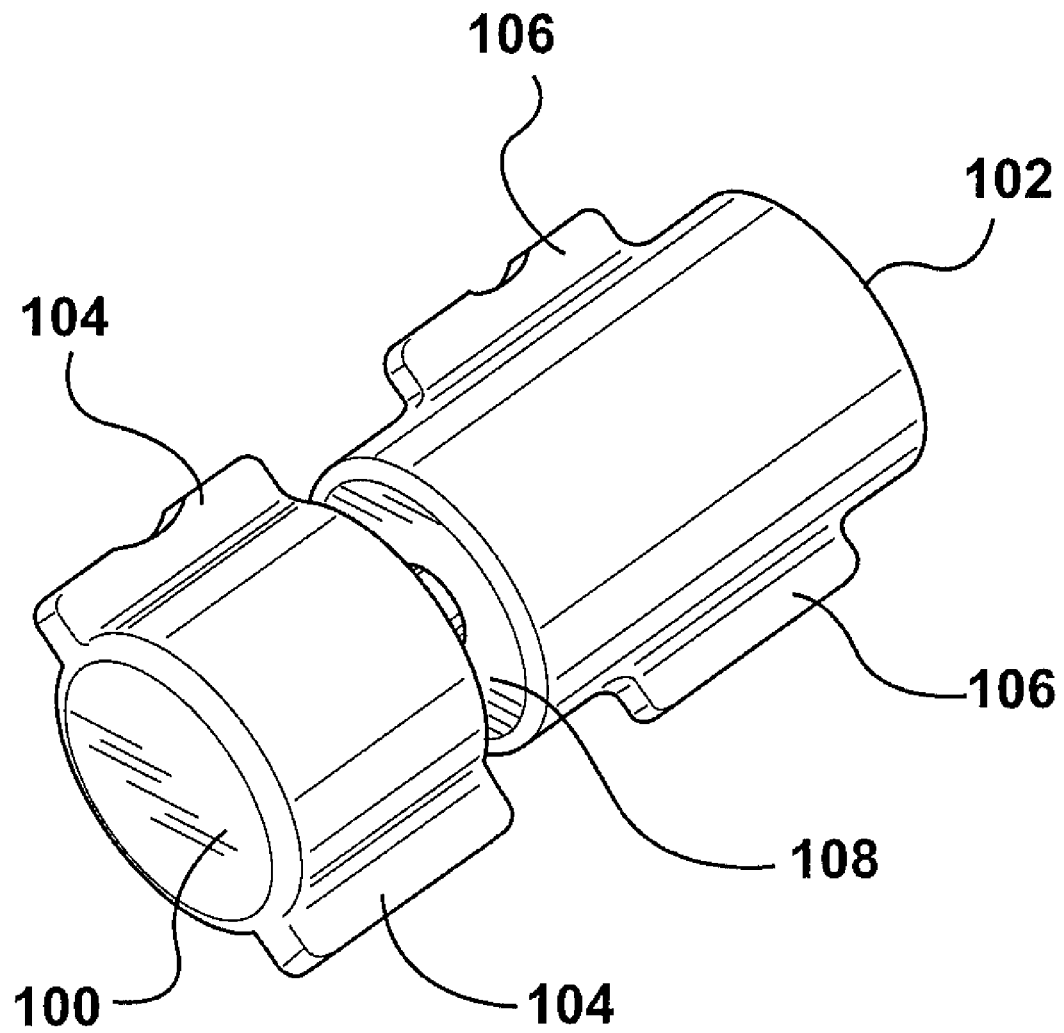
FIG. 6 is a perspective view of one embodiment of a frictional torque hinge.

FIG. 6 illustrates a frictional torque hinge available from Reell Precision Manufacturing Corporation, having a first hinge portion 100 and a second hinge portion 102 for relative rotation about a shaft 108. First hinge portion 100 has projections or wings 104 which are adapted to engage slots 105 in the first hinge housing position 110. The second hinge position 102 has wings or projections 106 which are adapted to engage slots 107 of the second hinge housing position 112.

As pressure is applied radially R the hinge damper resists rotation until a selected level is achieved in which event the hinge will rotate to the desired position. The hinge damper is different from the screw 70 described herein, in that the screw provides resistance to rotation by an axial force applied by tightening the screw, which over time would loosen. The hinge damper on the other hand provides a circumferential resistance or radial resistance to rotation (rather than axial) which exhibits little backlash or spring back and holds the position at the desired location. Furthermore hinge dampers do not loosen appreciably over time, and provide a substantially constant torque over time.

Various embodiments of the invention have now been described in detail. Since changes in and/or additions to the above-described best mode may be made without departing from the nature, spirit or scope of the invention, the invention is not to be limited to said details.

The invention claimed is:

1. An adjustable headrest for a chair having a generally upright backrest comprising:
    (a) a first arm member having one end rotatably connected to said backrest; (b) a second arm member having one end rotatably connected to said headrest;
    (c) said first arm member having another end rotatably connected to another end of said second arm member about an axis of rotation;
    (d) a housing disposed about said axis of rotation;

(e) a first hinge damper co-axially disposed in said housing about said axis of rotation between said first and second arms;

(f) said housing including a slot, and said hinge damper including a projection for engaging said slot;

for selective rotational movement and placement of said headrest to a desired position solely by pushing against the headrest.

2. An adjustable headrest as claimed in claim 1 wherein one end of said first arm member is rotatably connected to said chair about a second axis of rotation, and includes a second hinge damper co-axially connected between said chair and one end of said first arm member about said second axis of rotation for selective rotational movement and placement of said first arm member relative said chair.

3. An adjustable headrest as claimed in claim 2 wherein one end of said second arm member is rotatably connected to said headrest about a third axis of rotation, and includes a third hinge damper co-axially connected between said headrest and said one end of said second arm member about said third axis of rotation for selective rotational movement and placement of said headrest relative said second arm.

4. An adjustable headrest as claimed in claim 3 wherein said first, second and third hinge dampers have different resistance to torsion.

5. An adjustable headrest as claimed in claim 4 wherein said first hinge damper at said first axis of rotation is stronger than said second and third damper at said second and third axis of rotation, respectively.

6. An adjustable headrest for a chair having a generally upright backrest comprising:

(a) a first arm member having a first pair of spaced apart legs at one end rotatably connected to a said backrest of a chair;

(b) a second arm member having a second pair of spaced apart legs at one end rotatably connected to said headrest;

(c) said first arm member having a third pair of spaced apart legs at another end rotatably connected to a fourth pair of spaced apart legs disposed at another end of said second arm member about an axis of rotation;

(d) a housing disposed about said axis of rotation;

(e) damper means coaxially disposed in said housing about said axis of rotation between said third and fourth pair of spaced apart legs of said first and second arm for movement of said headrest from one position to another by solely applying pressure against at least one of said first or second arm members;

(f) said housing including a slot, and said damper means including a projection for engaging said slot, for selective rotational movement and placement of said headrest to a desired position.

7. An adjustable headrest as claimed in claim 6 wherein said damper means comprises a first damper means disposed in one of said legs of said third and fourth pair of spaced apart legs, and a friction screw in said other leg of said third and fourth pair of spaced apart legs.

8. An adjustable headrest as claimed in claim 6 wherein said first pair of spaced apart legs at said one end of said first arm member is connected to said backrest about a second axis of rotation, and includes a second damper means coaxially connected between said backrest and said first pair of spaced apart legs at said one end of said first arm member about said second axis of rotation for selective rotational movement of said first arm member from one position to another.

9. An adjustable headrest as claimed in claim 8 wherein said first pair of spaced apart legs of said first arm member is curved.

10. An adjustable headrest as claimed in claim 9 wherein said third pair of spaced apart legs of said first arm member is curved.

11. An adjustable headrest as claimed in claim 10 wherein at least one of said spaced legs of said first pair of spaced apart legs carries said second damper means about said second axis of rotation.

12. An adjustable headrest as claimed in claim 11 wherein said second pair of spaced apart legs at said one end of said second arm member is connected to said headrest, about a third axis of rotation, and includes a third damper means coaxially connected between said headrest and said second pair of spaced apart legs at said one end of said second arm member about said third axis of rotation for selective rotational movement of said second arm member from one position to another.

13. An adjustable headrest as claimed in claim 12 wherein said second pair of spaced apart legs of said second arm member is curved.

14. An adjustable headrest as claimed in claim 13 wherein said fourth pair of spaced apart legs of said second arm is curved.

15. An adjustable headrest as claimed in claim 14 wherein at least one of said second pairs of spaced apart legs carries said third damper means about said third axis of rotation.

16. An adjustable headrest as claimed in claim 15 wherein said second pair of spaced apart legs include a housing and said third damper means is housed in said housing.

17. An adjustable headrest as claimed in claim 15 wherein at least one of said first, second or third damper means has a different, coefficient of resistance to rotational movement than the other two damper means.

18. An adjustable headrest as claimed in claim 17 wherein said first, damper means at said first axis of rotation is stronger than said second and third damper means of said second and third axis of rotation respectively.

19. An adjustable headrest as claimed in claim 17 wherein said spaced legs each present housing means.

20. An adjustable headrest as claimed in claim 11 wherein said first pair of spaced apart legs each present a housing and said second damper means is housed in one of said housing.

21. The combination of an adjustable headrest and a chair having a backrest comprising:

(a) a first arm member having one end rotatably connected to said backrest;

(b) a second arm member having one end rotatably connected to said headrest;

(c) said first arm member having another end rotatably connected to another end of said second arm member about an axis of rotation;

(d) a housing disposed about said axis of rotation;

(e) a hinge damper co-axially disposed in said housing about said axis of rotation between said first and second arms for continuous selective rotational movement and placement of said headrest to a desired position solely by pushing against the headrest;

(f) one of said hinge damper, and housing including a slot, and said other of said hinge damper and housing including a protrusion to engage said slot.

* * * * *